United States Patent [19]
Ferrer-Salat et al.

[11] 3,718,655
[45] Feb. 27, 1973

[54] CERTAIN DIISONIAZID METHANE SULFONATE COMPLEXES

[75] Inventors: Carlos Ferrer-Salat, Jorge Ferrer-Batlles, Juan Colome-Riera, all of Barcelona, Spain

[73] Assignee: Laboratores Ferrer S.L., Barcelona, Spain

[22] Filed: July 28, 1970

[21] Appl. No.: 59,010

[30] Foreign Application Priority Data

July 28, 1969 Spain..................................369,952

[52] U.S. Cl. ...................260/294.8 H, 260/294.8 R, 260/294.8 S, 424/266
[51] Int. Cl.............................................C07d 31/48
[58] Field of Search.260/294.8 R, 294.8 H, 294.8 SB

[56] References Cited

UNITED STATES PATENTS 2,923,714 2/1960 Gardner et al. ...................260/294.8
3,236,881 2/1966 Distler et al. .....................260/294.8

OTHER PUBLICATIONS

Burger, Medicinal Chemistry, Third Edition, Part I, Wiley Interscience, pages 436–437 (1970).
Fieser & Fieser, Advanced Organic Chemistry, Reinhold Publishers, Pages 698–699, (1961).

Primary Examiner—Alan L. Rotman
Attorney—Michael S. Striker

[57] ABSTRACT

Di-isoniazidmethane sulfonate of d(+)2,2'(ethylenediimino)di-1-butanol having the formula

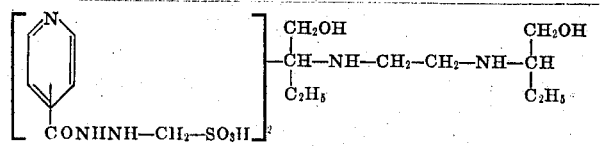

constituting an improved tuberculostatic agent and method of preparing the same by reacting d(+)2,2'(ethylenediimino) di-1-butanol and isoniazid methane sulfonic acid.

2 Claims, No Drawings

CERTAIN DIISONIAZID METHANE SULFONATE COMPLEXES

The present invention refers to a new process for obtaining isoniazid derivatives, having tuberculostatic action, which avoid nervous types of toxic side-effects of the same, and also the sudden appearance of resistant strains and, show superior bacteriostatic action to that of isoniazid.

The process for obtaining these derivatives is based fundamentally on the synthetic reaction between d(+)2,2'(ethylenediimino)di-1-butanol and isoniazid methane sulphonic acid.

The compound here claimed is obtained either by an addition reaction of isoniazid methane sulphonic acid with d(+)2,2'(ethylenediimino)di-1-butanol, or by a substitution reaction of an alkali or alkali earth metal salt of isoniazid methane sulphonic acid with the dihydrochloride of d(+)2,2'(ethylenediimino)di-1-butanol.

Some illustrative, nonlimitative examples with reference to possible routes for obtaining these derivatives are described.

EXAMPLE (A)

One hundred thirty-eight g of isoniazid are treated with 30 cc of formaldehyde (35–40 percent) in aqueous solution to obtain a formaldehyde derivative having an empirical formula $C_7H_7N_3O$. The formaldehyde derivative, previously suspended in water, is thoroughly stirred, and a stream of $SO_2$ from a pressure bottle passed through it. Isoniazid methane sulphonic acid is thus obtained.

Four hundred sixty-two g of isoniazid methane sulphonic acid is suspended in 1800 ml of ethanol together with 204 g of d(+)2,2'(ethylenediimino)di-1-butanol; the mixture is heated on a water bath until completely dissolved. A yellow solution is obtained which when treated for a few minutes with active charcoal becomes practically colorless after filtration. After cooling, the resulting solution is treated with petroleum ether until turbulency persists, and crystallization occurs on freezing; the product is washed with ethanol ether and dried under vacuum over $P_2O_5$. The product is purified by dissolving in hot ethanol, small impurities are filtered off, and the product crystallized by addition of petroleum ether.

EXAMPLE (B)

Sixty-one g of 95% $NaHSO_3$ are dissolved in 120 ml of distilled water and 56 ml of 30% HCHO added. After 15 minutes 76 g of isonicotinic acid hydrazide is added to this solution, and heated on the water bath for 4 hours. The mixture is then left overnight at room temperature. Crystals separate and are filtered and washed several times with ethanol.

The product is completely stable after drying under vacuum over phosphorus pentoxide for 24 hours. The yield of the preparation is approximately 60 percent.

Twenty-eight g of d(+)2,2'(ethylenediimino)di-1-butanol dihydrochloride and 58 g of sodium isoniazid methane sulphonate dihydrate are then allowed to react in methanol under reflux for between 1 and 2 hours.

The NaCl formed is filtered. The solvent is then removed by evaporation until half the original volume is obtained. The resulting solution is treated with petroleum ether, and crystallization occurs on freezing at 4°C. The product is then filtered on a Buchner filter, and washed several times with a mixture of methanol and petroleum ether.

The product is purified by dissolving hot followed by freezing to give total crystallization.

EXAMPLE (C)

20.4 g of d(+)2,2'(ethylenediimino)di-1-butanol dihydrochloride are dissolved in absolute ethyl alcohol with 12.8 g of $NaHCO_3$; NaCl precipitates and is separated by filtration. Forty-six g of isoniazid methane sulphonic acid are then added to the solution. A part of the solvent is eliminated by evaporation until half of the original volume remains. The resulting solution is treated with petroleum ether, and crystallizes on freezing at 4°C. The product is then filtered on a Buchner filter and washed several times with a mixture of methanol and petroleum ether.

The product is purified by dissolving hot followed by freezing to give total crystallization.

The product obtained is di-isoniazid methane sulphonate of d(+)2,2'(ethylenediimino)di-1-butanol; it has a molecular weight of 666.81, an empirical formula of $C_{24}H_{42}N_8O_{10}S_2$ and a structural formula:

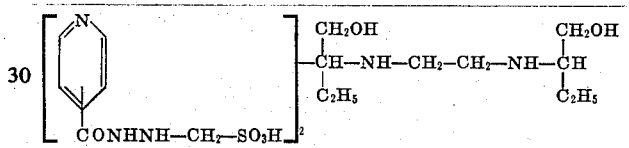

It is a white powder which crystallizes in the form of needles, the melting point is 121°–122°C with decomposition. It is soluble in water, methanol, N,N-dimethylformamide, acids and bases; it is insoluble in ethanol, ethyl ether and chloroform.

The U.V. spectrum shows an absorption maximum at 265 m$\mu$ and a minimum at 237 m$\mu$.

The specific rotation in a 5 percent aqueous solution is: $[\alpha]_D^{20°} = +3°$ Chromatography:
Support: chromatographic plates $F_{254}$
Eluant: methanol
Developer: U.V. lamp
Test concentration: 200 mg./cc.

Isoniazid methane sulphonate of d(+)2,2'(ethylenediimino)di-1-butanol gives an Rf value of 0.56–0.65.

The acute toxicity of di-isoniazid methane sulphonate of d(+)2,2'(ethylenediimino)di-1-butanol was determined in parallel experiments for the component products of the compound obtained according to the process referred to in this specification giving the following LD 50 values for oral administration in the mouse: 2.800 g/kg for this product; 0.365 g/kg for the isoniazid; 2.175 g/kg for the isoniazid methane sulphonate Na.$2H_2O$. Values for LD 50 were also obtained for these substances for intraperitoneal administration in the mouse, as follows: 2.210 g/kg for this product; 0.280 g/kg for the isoniazid; 1.410 g/kg for the d(+)2,2'(ethylenediimino)di-1-butanol.

Experiments to determine the bacteriostatic action of the product were carried out on H37Rv bacteria cultures, and the minimum inhibitory doses obtained for the isoniazid and the d(+)2,2'(ethylenediimino)di-1-butanol were determined in parallel experiments. In the solid Löwenstein medium bacteriostatic action was observed at a dose of 0.05 g/ml for the di-isoniazid methane sulphonate of d(+)2,2'(ethylenediimino)di-1-butanol and the isoniazid. On the other hand the inhibitory values for d(+)2,2'(ethylenediimino)di-1-butanol were of the order of 0.75 g/ml, clearly much higher than those of the other products observed. Identical results were obtained with the same H37Rv bacterial culture in Sauton's liquid medium for the three substances tested in parallel experiments.

Experiments to determine the induced resistance of this product were carried out on pathogenic mycobacteria maintained on successive cultures in the presence of increasing doses of the product. The human culture H37Rv was used as the internationally best known virulence model, cultivated in three different nutritive media. Parallel experiments with isoniazid were also carried out. The results showed that, in the Lowenstein medium, both isoniazid and di-isoniazid methane sulphonate of d(+)2,2'(ethylenediimino)di-1-butanol induce a "habit-forming" resistance which requires inhibitory doses of the same order for both (0.21 g/ml).

In Sauton's medium the inhibitory doses are of the order of 0.18 g/ml for the product of the invention and, similarly as for the isoniazid, no appreciable amount of induced resistance was observed.

In the Dubos albuminous medium with fraction V- it was observed that, for isoniazid, the necessary inhibitory doses were higher than those required to inhibit the original culture. However, as far as di-isoniazid methane sulphonate of d(+)2,2'(ethylenediimino)di-1-butanol was concerned, surprisingly no induced resistance was observed; on the contrary successive steps in the presence of the compound showed a bacteriostatic action which required very small inhibitory doses on the original culture (1.20 g/ml).

The compound obtained according to the process of the invention can be administered, mixed with suitable excipients, in the form of tablets (plain or coated), capsules or injectable solutions at a dose between 500 and 3,000 milligrams daily.

Having thus described the fundamental details of the process and the compound obtained, referred to in the present patent, it must be noted that experience can allow several variations in detail without modification of the fundamental idea, which is stated and summarized in the following.

We claim:

1. The compound which has the formula

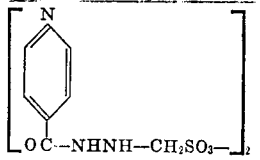

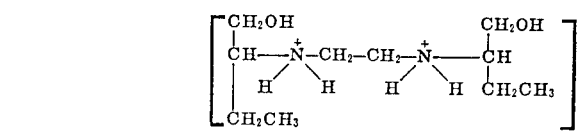

2. Di-isoniazid methane sulphonate of d(+) 2, 2' (ethylenediimino) di-1-butanol.

* * * * *